E. ZAHM.
FILTER.
APPLICATION FILED MAY 25, 1917.

1,328,221.

Patented Jan. 13, 1920.

Inventor
Edward Zahm
by Geyer & Popp
Attorneys

UNITED STATES PATENT OFFICE.

EDWARD ZAHM, OF BUFFALO, NEW YORK, ASSIGNOR TO ZAHM MANUFACTURING COMPANY, OF BUFFALO, NEW YORK, A CORPORATION OF NEW YORK.

FILTER.

1,328,221.  Specification of Letters Patent.  Patented Jan. 13, 1920.

Application filed May 25, 1917. Serial No. 170,899.

*To all whom it may concern:*

Be it known that I, EDWARD ZAHM, a citizen of the United States, residing at Buffalo, in the county of Erie and State of New York, have invented new and useful Improvements in Filters, of which the following is a specification.

This invention relates to that class of filters for liquids in which one or more filter tubes are employed through which the liquid to be filtered passes from one chamber to another.

In such filters, as heretofore constructed, the necks by which the filter tubes were supported were made separate from the bodies and liable to become loose and interfere with the filtering operation, and the bore of the necks also were of considerably smaller diameter than the bore of the bodies which rendered it difficult to thoroughly clean the interior of the filter tubes when this became necessary.

It is the object of this invention to provide filter tubes of this character with necks which are strong and durable and incapable of becoming detached from the bodies of the tubes, and the bores of which are of substantially the same diameter as the bodies, so as to enable the interior of the latter to be readily, easily and thoroughly cleaned, as well as permitting the thickness of the filter walls to be increased so as to prolong the life of the filters accordingly.

Figure 1:
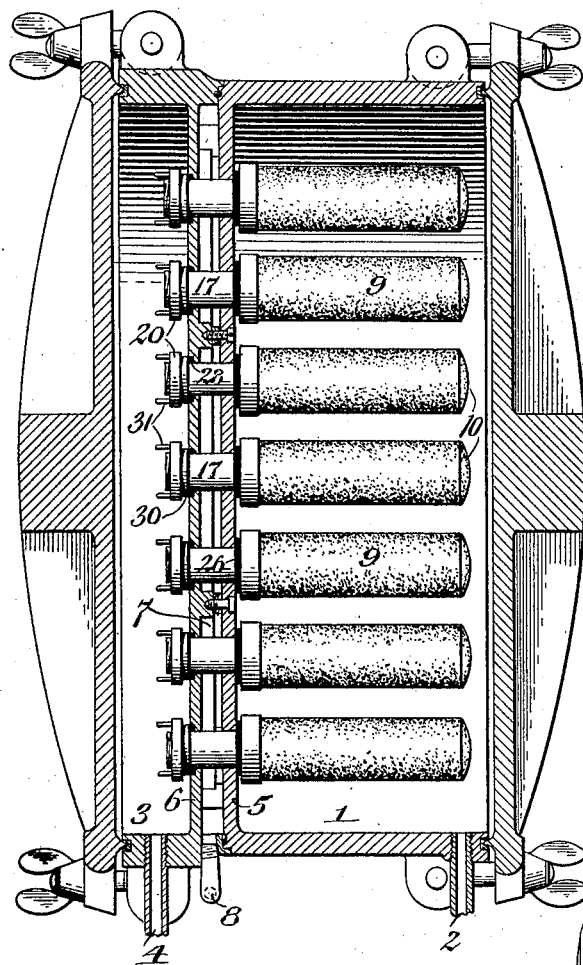
Figure 3:
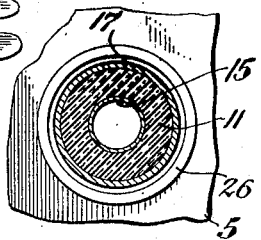
Figure 2:
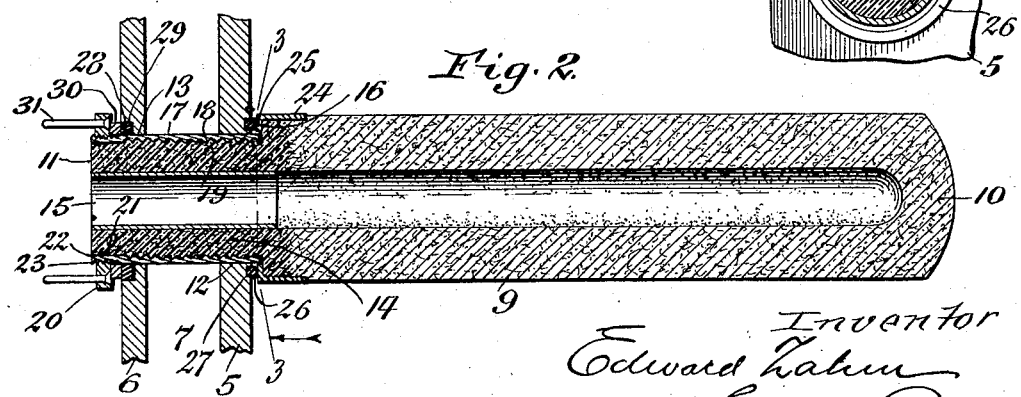

In the accompanying drawings: Figure 1 is a vertical section of a filter embodying my invention. Fig. 2 is a longitudinal section of one of the filter tubes, on an enlarged scale. Fig. 3 is a vertical transverse section taken on the correspondingly numbered line in Fig. 2.

Similar characters of reference indicate corresponding parts throughout the several views.

Although my improved filter tube may be embodied in a filter which may vary considerably, so far as details of construction are concerned, the same as shown in the drawings is embodied in a filter which comprises an inlet chamber 1 provided with a supply pipe 2 through which the liquid to be filtered is admitted to this chamber, and an outlet chamber 3 which is adapted to receive the filtered liquid and deliver the same through a discharge pipe 4. These two chambers are arranged side by side and have their opposing inner heads 5, 6 connected with each other but separated by an intervening space 7 which communicates with the outer atmosphere through a drip pipe 8.

A plurality of filter tubes are arranged in the inlet chamber and mounted on a support formed by the inner walls or heads 5, 6 of the two chambers so that the liquid passes from the inlet chamber inwardly through each of the filtering tubes and thence into the outlet chamber during which movement of the liquid any impurities or solid matter contained in the liquid is separated therefrom and deposited on the exterior of the tube.

Each of the filter tubes comprises a tubular or hollow body 9 which is closed at its front end by a head 10 and a tubular neck 11 arranged at the rear end of the body and communicating with the interior of the latter, said body, head and neck being constructed integrally of porous material. The bore of this neck is of the same diameter, or substantially the same, as the bore of the body of the filter tube and projects through and is secured in coinciding openings 12, 13 formed in the inner walls 5, 6 of the inlet and outlet chambers. By forming this neck in one piece with the body of the filter tube, the construction is materially simplified, the cost of manufacture is reduced, and it is possible to make a much stronger joint between the tube and the filter chambers than is possible when the neck is made separate from the body.

In order to further increase the strength of the filter tube its neck portion and that part of its body adjacent to the neck where the same is mounted on the filter chamber are preferably impregnated, filled or saturated with pitch or other suitable indurating material, so as to render the same impervious or nonporous and materially add to the strength of the same. The area of this impregnated or indurated part of the filter tube is indicated by the heavily section lined area 14 in Fig. 2.

For the purpose of still further increasing the strength of this neck and the adjacent part of the body so that the same is not liable to be broken off adjacent to its mounting on the filter chambers during the operation of cleaning the exterior surfaces of the tube, a metal tubular lining 15 is secured in the bore of the neck and the adjacent part of the body of the filter tube, which lining is preferably secured in place by cement interposed between the periphery of the same and the bore of the filter tube. The neck of the filter tube is of smaller diameter on its periphery than the periphery of the body of the filter tube so as to form a rearwardly facing shoulder 16 thereon. On its periphery this neck is provided with a reinforcing sleeve 17 which is preferably constructed of metal and secured to the neck by placing cement between the opposing surfaces of these parts and also by providing the front part of this sleeve with an internal screw thread 18 which engages with an external screw thread 19 on the front part of the periphery of the neck adjacent to the body of the tube. The rear part of the bore of the reinforcing sleeve is preferably unthreaded and engages with the corresponding non-threaded peripheral surface 21 of the neck at its rear end, thereby avoiding undue reduction in the thickness of the metal in the sleeve at this point and rendering it possible to form an external thread 23 on the rear end of the reinforcing sleeve which is adapted to receive an internally-threaded clamping screw nut or ring 20 which forms part of the means whereby the filter tube is detachably secured in the inner walls of the filter chambers.

At the rear end of the body of the filter tube the same is provided on its periphery with a reinforcing ferrule 24 of the metal which is preferably secured thereto by means of cement interposed between its bore and the periphery of the body of the filter tube. The front end of this reinforcing ferrule preferably extends a short distance forwardly beyond the impregnated portion or area of the filter tube, so as to prevent breakage or fracture of the filter tube adjacent to the junction between the porous and non-porous parts of the same. At its rear end the ferrule is provided with an inwardly-projecting annular flange 25 which bears against the shoulder formed between the rear end of the filter body and its neck.

In order to produce a water-tight joint between the filter tube and the inner wall 5 of the inlet chamber, a gasket or packing ring 26 of rubber or similar elastic material is arranged around the neck and in an annular groove 27 formed on the inner side of the wall 5 and bearing against the opposing surface of the ferrule. A similar water-tight joint is produced between the filter tube and the inner wall 6 of the outlet chamber by means of a packing ring or gasket 28 arranged around the neck and in an annular groove 29 formed on the inner side of the wall 6 and a washer or follower 30 interposed between the gasket 28 and the opposing front side of the clamping ring or nut 20.

When the parts are thus assembled, and the clamping nut is turned by means of the handles or finger pieces 31 projecting rearwardly therefrom, the front gasket will be compressed between the filter body and the front wall 5 and the rear gasket will be compressed between the rear wall 6 and the clamping ring, thereby causing the gaskets to seal or pack the joints between the neck of the filter tube and the inner walls thereof and effectually prevent any of the liquid from passing from the inlet chamber or the outlet chamber into the leak space 7. If, however, either of these joints should leak, the escaping liquid will pass through the drip pipe 8 where it is observed by the attendant and thereby serves as an indicator that the filter requires tightening in order to maintain its efficiency.

By this construction of the filter and the means of mounting the same on the filter chamber, the interior of the filter can be cleaned with greater facility, the possibility of leakage through the joints between the filter tube and the filter chambers is materially reduced, and the filter tube is mounted on the tube with greater security, so that the same is not liable to be broken off adjacent to its neck while the filter is being cleaned.

I claim as my invention:

1. A filter comprising a filter tube having a body and a neck constructed integrally of porous material and having the neck portion thereof saturated with a strengthening material.

2. A filter comprising a filter tube having a body and a neck constructed integrally of porous material and having the neck portion thereof saturated with a strengthening and indurating material.

3. A filter comprising a filter tube having a body and a neck constructed integrally of porous material and having the neck and the adjacent part of the body saturated with an indurating material.

4. A filter comprising a tube having a body and neck constructed integrally of porous material and having a shoulder between said neck and body and said neck being provided externally on the front end of its periphery with a screw thread and on the rear end thereof with an unthreaded part, a reinforcing sleeve surrounding said neck and provided on the front part of its bore with a screw thread engaging with the thread of said neck, on the rear part of its bore with an unthreaded surface which engages with the unthreaded part of said neck and the front part of the periphery of said sleeve being threaded while the rear part of the same is unthreaded, and a clamping screw nut engaging with the external thread of said sleeve.

EDWARD ZAHM.